United States Patent
Tung

[11] Patent Number: 5,780,539
[45] Date of Patent: Jul. 14, 1998

[54] GLASS FIBER FILLED POLYESTER POLYMERS

[75] Inventor: Deborah Ann Snell Tung, Tallmadge, Ohio

[73] Assignee: Shell Oil Company, Houston, Tex.

[21] Appl. No.: 862,504

[22] Filed: May 23, 1997

[51] Int. Cl.[6] .................................................. C08L 67/02
[52] U.S. Cl. .................... 524/494; 524/601; 524/605; 521/79; 521/91; 521/182
[58] Field of Search .......................... 524/494, 601, 524/605; 521/79, 91, 182

[56] References Cited

U.S. PATENT DOCUMENTS

| | | | |
|---|---|---|---|
| 4,806,586 | 2/1989 | Nakai | 524/413 |
| 4,892,763 | 1/1990 | Duse | 428/34.1 |
| 5,187,216 | 2/1993 | Cassell et al. | 524/261 |
| 5,298,550 | 3/1994 | Riccardi | 524/513 |

FOREIGN PATENT DOCUMENTS

| 0480524 | 4/1992 | European Pat. Off. | C08L 67/02 |
|---|---|---|---|

*Primary Examiner*—Patricia A. Short
*Attorney, Agent, or Firm*—Dennis V. Carmen

[57] ABSTRACT

A polyester polymer containing micro glass fibers having an aspect ratio of greater than 1000, preferably from about 2000 to about 5000. Those micro glass fibers having these aspect ratios, preferably with mean fiber diameters of 1 microns or less, act as excellent nucleating agents to promote crystallization of the polymer melt during its cooling phase, improve the rheological behavior of the melt, reduce the crystalline half time during cooling phases, and are acceptable in polyester molded or thermoformed products which come into contact with food or beverage.

27 Claims, No Drawings

GLASS FIBER FILLED POLYESTER POLYMERS

FIELD OF THE INVENTION

The invention relates to polyester polymers, and in particular, to polyester polymers filled with micro glass fibers having an aspect ratio of greater than 1000.

BACKGROUND OF THE INVENTION

Glass fibers have been used in a wide variety of thermoplastic and thermosetting resins to enhance their rigidity and other mechanical properties. Glass fibers have also been used in polyester polymers manufactured into molded articles for the same purpose. For example, U.S. Pat. No. 4,806,586 describes the preparation of polyacetal or aromatic polyester resins filled with a combination of glass fibers having a fiber length from 50 to 1000μ and a diameter of 2 to 30μ for reinforcement with a mica of certain dimensions to improve the weld strength, surface appearance of the weld, and other mechanical properties of the molding. Improving the rigidity of polyester containing polymers by using glass fibers was also suggested in EP 0480524. This publication describes the preparation of mixture of PBT, thermoplastic elastomer, and flame retardant filled with glass fibers having a length of less than 200μ and a diameter of less than 25μ in order to improve the rigidity of the polymer without too strong a reduction in flow and/or tracking index.

According to U.S. Pat. No. 4,892,763, glass fibers having a diameter of from about 5 to about 20 microns and an aspect ratio of 50 to about 1000, incorporated into bottle grade polyester resins were key factors in order to improve the mechanical strength of the polyester bottle, as well as its thermal stability and dimensional stability at high temperatures. Those glass fibers having an aspect ratio of about 400 and a fiber diameter of about 11μ were tested and shown to improve the mechanical strength and dimensional stability of stretch blown bottles.

Reinforcing the polyester polymer with glass fiber to increase its mechanical strength, both at room and elevated temperatures is described in these patents. However, there exist a host of problems associated with the processing of polyester polymers which, if improved, not only would result in improved cycle times but also in an improved product. For example, in the melt processing stage of polyester pellets in an extruder, the rheology of the polyester polymer should ideally be one of lowered apparent melt flow viscosity at high shear rates to reduce the stresses on the screws and increase throughput. This behavior should be coupled with as steep an increase in the apparent melt flow viscosity when the shear rate is lowered to zero, as observed upon exit from the extruder through the die, in order to facilitate handling and shaping of the bulk polyester mass.

A mass with higher apparent melt viscosity is also more desirable if the polyester is to be foamed with a gas so that the mass has enough bulk to rapidly support the formation of cell walls without rupture. This would lead to forming a foamed product which has a more uniform cell size than a foamed product in which cells ruptured due to the lack of cell wall strength during the early stages of foaming.

Once the polyester polymer pellets are melted and processed through an extruder, they may be formed into sheets or molded from the melt, and either foamed or non foamed. In any case, the crystallization half time and the onset of crystallization of the polyester polymer measured by DSC in the heating and cooling cycle should be as short as possible in processing the PET into shaped articles, including thermoforming, injection molding, and blow molding. Polyester polymers which exhibit early onsets of crystallization and short crystallization half times are desirable because such polymers can become quickly rigid, leading to faster demold times and shorter cycle times when thermoforming polyester sheets. Shorter crystallization half times and earlier onsets of crystallization (as well as early arrival of the crystallization peak temperatures) during the cooling cycle are also desirable for the same reasons in other processing techniques, such as injection molding or stretch blow molding to make beverage containers.

SUMMARY OF THE INVENTION

It is an object of the invention to dramatically lower the crystallization half time of a polyester polymer during its cooling cycle. Another object of the invention is to improve the onset of the crystallization time and the early arrival of the peak crystallization peak temperature during the cooling phase of the polymer, all as measured by DSC analysis.

A further object of the invention is to increase the apparent melt strength viscosity of the polymer at low or no shear, as well as lower its apparent melt flow viscosity at higher shear rates.

At least one, or all, of these objects have surprisingly been met by incorporating into a polyester polymer micro glass fibers having an aspect ratio of greater than 1000, preferably from about 2000 to about 5000. Those micro glass fibers having these aspect ratios with mean fiber diameters of 1 microns or less are particularly advantageous for satisfying the stated objectives of the invention. We have found that glass fibers with these aspect ratios act as excellent nucleating agents to encourage crystallization of the polymer melt during its cooling phase. When compared against the same polyester polymer having no glass fibers, or against the same polyester polymer containing the same amount of glass fiber but having a conventional aspect ratio of about 500, the polyester polymers containing the microglass fibers exhibited marked improvements in rheological behavior and speed by which crystallinity was observed.

A further advantage to using the microglass fibers in the polyesters according to the invention is that the FDA acceptability of the polyester molded or thermoformed products which come into contact with food is maintained.

There is also provided processing methods, such as extrusion to sheet or mold, injection molding, and stretch blow molding, of polyester polymers containing micro glass fibers having an aspect ratio of greater than 1000, particularly those in which the diameter is 1μ or less. The microglass fibers having an aspect ratio of more than 1000 are combined with a polyester polymer during or subsequent to the manufacture of the polyester polymer.

DETAILED DESCRIPTION OF THE INVENTION

The polyester polymer of the invention is a thermoplastic polymer or psuedo thermoset polymers having some thermoplastic characteristics and which crystallize at room temperature or higher, preferably a thermoplastic polymer which can be pelletized and subsequently melt extruded, optionally, further advance to a thermosetting polymer or a reversible thermoset upon reaction with further crosslinking monomers or heat. Preferably, the polyester polymer is thermoplastic throughout its life.

The polymer may be either an aromatic polyester or an aliphatic polyester. The polyester polymer is preferably an aromatic polyester in a weight percent of 50% or more, more preferably 80% or more, most preferably 100%, based on the weight of the polyester polymer. Illustrative examples of aromatic polyester resins are polyalkylene terephthalates, such as polyethylene terephthalate, polypropylene terephthalate, and polybutylene terephthalate. The particular polyester polymer should be one that crystallizes, preferably at 40° C. or more, more preferably at 60° C. or more.

Other suitable polyester polymers are those which contain repeat units which are derived from diacids other than terephthalic acid and/or glycols in addition to or other than ethylene glycol. For instance, other suitable acids include isophthalic acid, naphthalenic dicarboxylic acid, 1,4-cyclohexane dicarboxylic acid, 1,3-cyclohexane dicarboxylic acid, succinic acid, glutaric acid, adipic acid, sebacic acid, 1,12-dodecane dioic acid, and the functional acid derivatives thereof such as the dimethyl, diethyl, or dipropyl esters of the dicarboxylic acids. Further, the anhydrides or the acid halides of these acids may be employed. Higher functional acids may also be used, including benzenetricarboxylic acid, oxoisophthalic acid, pyromellitic acid, and the like.

In addition to the commonly used ethylene glycol and diethylene glycol monomer for making an aromatic polyester polymer, other suitable diol residues include, in addition to or replacing, but preferably only up to 20 mole percent, the linear diols such as propylene glycol, 1,3 propane diol, triethylene glycol, 2,4-dimethyl-2-ethylhexane-1,3-diol, 2-ethyl-2 -butyl-1,3-propane diol, 2-ethyl-2-isobutyl-1,3-propane diol, 1,3-butane diol, 1,4-butane diol, 1,5-pentane diol, 1,6-hexane diol, 1,2-, 1,3- and 1,4-cyclohexane dimethanol, 2,2,4,4-tetramethyl-1,3-cyclobutane diol, 1,4-xylylene-diol, and the longer chain diols and polyols made by the reaction product of diols or polyols with alkylene oxides; and the crosslinking polyols such as glycerol, sucrose, trimethylol propane, and pentaerythritol.

The most common types of polyesters employed herein are the aromatic polyesters, and in particular polyethylene terephthalate, polypropylene terephthalate, polybutylene terephthalate, polyethylene naphthalate, polybutylene naphthalate, as well as these polyesters modified with small amounts, i.e., up to 20 mole percent, of other aforementioned acids or diols/triols.

According to the invention, in order to reduce cycle time and demolding time, the polyester polymer contains microglass fibers having an aspect ratio (L/D) of greater than 1000, preferably 1200 to 10,000, more preferably from about 2000 to about 5000. By an aspect ratio is meant the mean aspect ratio, and can be calculated according to the equation:

$$R = L/D$$

where R is the aspect ratio, L is the mean length of fibers, and D is the mean diameter of the fibers.

The polyester polymers containing the microglass fibers having an aspect ratio of more than 1000 have been found to have shorter crystallization half times, higher crystallization peak temperatures, and earlier crystallization peak onsets during the cooling cycle of the polymer from a melt, than either the same polyester polymer containing no glass fiber or those containing conventional glass fiber, such as those having an aspect ratio of 500 or less and fiber diameters ranging from 5 to 15μ. This leads to faster demold times, faster cycle times when thermoforming a sheet, and improved cell uniformity and surface appearance.

In one embodiment of the invention, the polyester polymers containing the microglass fibers have a crystallization half time in seconds, which is at least 10 percent lower than a crystallization half time in seconds of the same polymer made in the absence of glass fibers or containing glass fibers which have aspect ratios outside of the range used in the invention, as measured by DSC in the cooling cycle from 290° C. at a rate of 10° C. per minute. We have observed at least a 20 percent decrease and even at least a 30 percent decrease in the crystallization half time using the polyester polymers of the invention compared to the control polymers made in the absence of glass fibers or using conventionally sized fibers.

In yet another embodiment, the polyester polymers containing the microglass fibers have an onset of a crystallization peak as measured by DSC in the cooling cycle from 290° C. at a rate of 10° C. per minute, which arrives at a temperature which is at least 5° C. earlier than the same polymer containing no glass fiber or containing conventionally sized chopped glass fibers. We have observed this phenomena occuring at an onset temperature which is even at least 7° C. earlier than the same polymer made in the absence of any glass fiber or using conventionally sized glass fibers.

In a further embodiment, the polyester polymers containing the microglass fibers have a crystallization peak temperature as measured by DSC in the cooling cycle from 290° C. at a rate of 10° C. per minute, which peak arrives at a temperature which is at least 5° C. earlier than the same polymer containing no glass fiber or conventionally sized fibers. In more preferable embodiments, the peak temperature in the cooling cycle arrives at least 8° C. earlier than the same polymer containing no glass fiber or conventionally sized fibers.

The mean diameter of the microglass fibers used in the invention should be 2 microns or less, preferably about 1 micron or less. In general, the mean diameter of the microglass fiber is about 0.9 microns or less, although those having a mean diameter of from about 0.2 microns to 0.8 microns, even from about 0.3 to about 0.7 microns, are more preferable, to enhance the crystallization characteristics and surface appearance in applications where it is important.

By using the microglass fibers having the specific dimensions, they act as nucleating agents which not only provide improved crystallization times from a melt, and thereby faster processing/cycle times, but it also increases the melt strength viscosity of a polyester melt which improves its handling properties and is particularly desirable as added bulk when foaming the melt. The microglass fibers used in the invention give added strength to cell walls by retarding their tendency to rupture during the foaming process. This phenomena is at least due in part to the improved crystallization half time of the polymer melt resulting from the use of the microglass fibers, as well as the increased melt flow viscosity. Furthermore, by employing the microglass fibers of these dimensions, the polyester polymers exhibit favorable non-newtonian behavior, in that their viscosity decrease at higher shear rates and increase at lower shear rates. This is particularly desirable for the sake of not further increasing the stresses within an extruder at high temperatures/high shear rates substantially above that already experienced in extruding polyester melts without glass, as well as maintaining its throughput rates, yet having favorable bulk and rigidity by the rapid rise in apparent viscosity upon cessation of the shear when the polymer exits the extruder though a die or into a mold.

Further, as noted above, the FDA approval of polyester polymers containing these microglass fibers is maintained in such applications as food trays, where the polymer comes into contact with food or beverages.

The amount of microglass fibers is not particularly limited, but generally, from 0.1 weight percent to 2 weight percent based on the weight of the polyester polymer are suitable for many applications, especially when using an extruder. At amounts of greater than 2 weight percent, the viscosity of the polyester polymer dramatically increases, which can lead to clogging up the filters of the processing equipment. The effects of the invention are quite noticeable at only 1.5 weight percent or less, even at about 1 weight percent or less, such as from 0.5 to 1 weight percent. However, greater than 2 weight percent of the microglass fiber can be used where the polymer can be processed at higher viscosities, such as in injection molding operations. In these cases, a thermoplastic polymer can be injection molded with up to 50 weight percent of the microglass fiber.

Another advantage of the invention is that the microglass fibers used in the polyester polymer need not contain any binders or sizings (coupling agents) to achieve the advantages noted herein. If desired, however, the glass fibers can be sized with the conventional sizing agents known in the art, such as polyvinyl acetates, epoxy, silane, isocyanate, and titanate compounds.

The exact composition of the microglass fiber is not particularly limited. Any glass fiber with a defined dimension is suitable for use in the invention. Typical glass fiber chemical compositions include mixtures of silicon oxide with other typical ingredients found in soda, ash, and lime. The glass may be combined with other oxides such as boric oxide to lower its coefficient of expansion. Other suitable oxides include aluminum oxide, calcium oxide, lithium oxide, cerium oxide, barium oxide, zinc oxide, and the like.

The microglass fiber containing polyester polymers are not limited to a particular intrinsic viscosity. For most applications, however, the intrinsic viscosity of the polyester polymer generally ranges from 0.7 dl/g to 1.5 dl/g, more preferably from 0.8 to 1.2 dl/g, as determined at 25° C. using 0.5 g of polymer per 100 ml of solvent consisting of 60 weight percent phenol and 40 weight percent tetrachloroethane.

The microglass fibers may be added at any stage of the polyester polymerization reaction. For example, the microglass fibers may be incorporated in dry bulk form to the monomers in a reaction zone for preparing the polyester polymer. Optionally, the microglass fibers may be admixed with a monomer as a slurry, such as with the diol, and then combined with the remaining monomers which react to form a polyester polymer containing microglass fibers. Since the microglass fibers may be incorporated directly into the reactive zone of monomers, such as by directly incorporating the microglass fibers as such or through the glycol monomers used to manufacture the polyester polymer, the invention has the advantage of dispensing with the need for retrofitting melt blending equipment or extrusion equipment with metering devices and hoppers to feed the microglass fibers into the melt down stream. Polyester pellets can be manufactured at any intrinsic viscosity containing the microglass fibers.

Optionally, the microglass fibers can be combined with the polyester polymer during a solid state polymerization reaction, as well as in common melt blending procedures such as in a batch reactor or in an extruder.

Any method of making the polyester polymer is included within the scope of the invention. Conventional methods include reacting the acid or its ester derivative with the glycol/polyol component or its ester forming derivative under heat in the presence or absence of an ester-interchange catalyst or an esterification catalyst, and then heating in the presence of a polymerization catalyst.

Suitable polymerization catalysts include the compounds of lithium, sodium, potassium calcium, barium, magnesium, manganese, cobalt, germanium, antimony, lead, tin, copper, titanium, palladium, platinum, gold, or silver. Preferable as catalysts are those compounds which can be reduced to elemental form which may assist in the reduction of cycle times in the mold or the time required to re-heat the polyester polymers in such operations as blow molding. Particularly preferable are antimony compounds, such as antimony trioxide and antimony acetate.

The polyester polymers filled with the microglass fibers can be blended or co-reacted with other thermoplastic polymers. Examples of other polymers suitable for blending include elastomers, polycarbonate, other types of polyester thermoplastics, polyethylene, polypropylene, ethylene-propylene copolymers, ethylene-vinyl acetate copolymers, polyamides, polystyrenes, styrene-butadiene copolymers, styrene-butadiene-acrylonitrile copolymers, styrene-acrylonitrile copolymers, polyurethanes, fluoroplastics, polyphenylene oxides, polyphenylene sulfide, polybutadiene, polyolefin halides, vinyl polyhalide, butyl rubbers, silicone rubbers, and graft copolymers of polyacrylates.

Other additives may be incorporated into the polyester polymer of the invention during or subsequent to the manufacture of the polyester polymer, including stabilizers such as phosphoric acid, phosphorous acid, orthophosphoric acid, phosphonic acid, and derivatives of these such as triphenyl phosphite, trimethyl phosphate, triphenyl phosphate, dimethyl mono-$\beta$-hydroxyethyl phosphate, mono-methyl di-$\beta$-hydroxyethyl phosphate, tri-$\beta$-hydroxyethyl phosphate, phenylphosphonic acid, and dimethyl dibenzylphosphonate; antistatic agents, flame retardants, other nucleating agents, and colorants. Further, depending upon the desired application, other fillers may be added so long as they do not detract from the particular advantage obtained in this invention which is deemed as necessary by the practitioner. The preferred stabilizers are those which are capable of reducing the polymerization catalyst compound to its metallic elemental form.

The filled polyester polymers of the invention may be processed in a variety of ways. For example, filled polyester polymer may be melted in an extruder and extruded as a melt into a mold. The filled polyester polymer may optionally be extrusion molded into the mold as a foamed molded object. Alternatively, the filled polyester polymer may be extrusion molded into a foamed sheet.

Examples of suitable applications for the polyester polymers of the invention are food trays, optionally foamed, on which food is heated by radiant, convection, or microwave energy; yarns; fibers; films; beverage bottle preforms and monoaxial or biaxial stretch blow moldings such as beverage bottles; photographic and packaging films, interior articles, and parts for machines and automobiles.

The invention is further illustrated by the nonlimiting examples described below.

EXAMPLE 1

The following compositions were prepared in research scale glass tube reactors. The PET compositions were made as follows. 67.9 grams of dimethylterephthalate, 17.7 milliliters of ethylene glycol, a slurry of 30 ml of ethylene glycol containing 0.68 grams of a Micro-Strand® 106 glass microfiber, having a mean fiber diameter of about 0.65µ and a mean aspect ratio of about 3000, commercially available from Schuller filtration, and 75 ppm of manganese catalysts were charged into a tube reactor. The starting temperature was 180° C. and after 2 hours of reaction the final temperature was 210° C. Subsequently, 210 ppm of antimony was added and the temperature was raised to 275° C. over a period of 30 minutes. The reaction was maintained at 275° C. for 2 hours at less than 1 mmHg vacuum.

The amount of microglass fiber in the glycol slurry method represented about 0.5 weight percent of the composition. The same polyethylene terephthalate polymer was prepared as a control, except that the microglass fiber was omitted.

Subsequently, solid state polymerizations were carried out in small size reactors at 60 gram batches. The batches were first crystallized at 200° C. for about 30 minutes, followed by a temperature raise to 232° C. for the solid state reaction at a nitrogen flow of 6 SCFH. Samples for intrinsic viscosity were taken every one-half to one hour. The final intrinsic viscosity of the control sample was about 1.10, and that of the 0.5 weight percent microglass fiber was about 1.0.

Additional other samples were prepared for further comparison and evaluation. The second sample containing 1.0 weight percent of microglass prepared by the same method as described above but at double the amount of the same microglass fiber was solid state polymerized to an IV of 1.10. Furthermore, a sample of 9552 PETLITE® polyester polymer commercially available from Shell Chemical Company having an intrinsic viscosity of 0.95 and typically used to foam into food trays was also prepared as a comparative example.

The apparent melt viscosity of the microglass fiber filled PET, the PET control, and the 9552 PETLITE® polyester polymer were measured according to Shell capillary rheometric test method, at 266° C. using a 1" capillary die. The results of apparent melt viscosities in MPas at 266° C. at the designated shear rates are shown below in Table 1 for each sample prepared.

TABLE 1

| Sample | (Semilogarithmic) Shear Rate(1/sec), at 266° C. | | | | | |
|---|---|---|---|---|---|---|
| | 4 | 13 | 40 | 150 | 400 | 1,333 |
| 9552 Petlite ® Polymer (MPas) | 1.6 | 1.6 | 1.4 | 1.1 | 0.8 | 0.5 |
| Control(MPas) | 2.2 | 2.1 | 1.8 | 1.4 | 0.9 | 0.6 |
| 0.5% microglass fiber/PET(MPas) | 3.0 | 2.6 | 2.1 | 1.6 | 1.1 | 0.7 |
| 1.0% microglass fiber/PET(MPas) | 4.0 | 3.3 | 2.3 | 2.0 | 1.2 | 0.8 |

The results indicate that at both 0.5 and 1.0 weight percent loadings of microglass fiber, the apparent melt viscosity at low shear rates was much higher than the control containing no microglass fiber and the commercially available 9552 PETLITE® polymer, which is a good indicator that the foaming process, cell structure, mechanical properties of the resulting polymer should improve. Foamed samples cut from an extruded sheet were microscopically observed at 100× to have a more uniform cell structure than those observed from cuts of extruded foamed sheets of PET without any glass fiber.

The apparent melt viscosities of the polymers filled with microglass fiber also rapidly decreased with increasing shear rates, approaching that of the unfilled polyester control and comparative example. This advantageous feature indicates that, in spite of the presence of glass loadings, the equipment will not experience any substantial jump in stress on the mixing device, and the throughput can be substantially maintained.

The crystallization characteristics for each of these samples were also evaluated by differential scanning calorimetry method. The process used in the DSC test method is as follows: Samples were premelted at 290°-300° C. from 10 minutes and quenched on an aluminum block in a desiccater. The samples were then heated from 30° to 290° C. at a rate of 10° C. per minute, held at 290° C. for 10 minutes, and then cooled at 10° C./min to 30° C. The heating and cooling cycles were analyzed for crystallization behavior. Table 2 tabulates the thermal results for each sample tested.

TABLE 2

| Sample | $T_g$, C.° | mp, C.° | Crystallization Peak | | Crystallization Half Time(s) | Crystallization % |
|---|---|---|---|---|---|---|
| | | | Onset °C. | Peak °C. | | |
| 9552 PETLITE ® Polymer | | | | | | |
| Heating | 73.2 | 254.5 | 127.1 | 144.5 | 80.2 | 27.7 |
| Cooling | | | 215.3 | 202.3 | 87.1 | 27.7 |
| Control | | | | | | |
| Heating | 75.8 | 255 | 128.9 | 144.2 | 82.6 | 27.9 |
| Cooling | | | 221.1 | 207.4 | 92.1 | 37.4 |
| 0.5% microglass fiber/PET | | | | | | |
| Heating | 75.5 | 259.1 | 126..2 | 133.3 | 41.18 | 23.9 |
| Cooling | | | 220.4 | 216.9 | 46.8 | 40.8 |
| 1.0% microglass fiber/PET | | | | | | |
| Heating | 75.2 | 252.3 | 117 | 124 | 44.6 | 24.1 |
| Cooling | | | 219.6 | 214.8 | 42.5 | 33.3 |

The results of the table indicate that the samples prepared with 0.5 and 1.0 weight percent microglass fiber exhibited crystallization half times in the heating cycle almost 50 percent lower than the control without microglass fiber and the commercial sample; and at least a 50 percent shorter crystallization half time in the cooling cycle over the control sample with no microglass fiber. These results indicate that the microglass fibers used in the PET polymers promote faster crystallization times during both heating from the ambient and cooling from the melt.

EXAMPLE 2
Dry Bulk Esterification Method

In this example, samples of PET with microglass fiber were slightly scaled up to 25 pound batches. Two separate batches of polyester polymer were prepared by adding the same microglass fibers as in Example 1 above, except in dry bulk form, directly to a reaction vessel containing the 17.3 pounds of terephthalic acid and 17.8 pounds of ethylene glycol. The amount of dry bulk microglass fiber added was sufficient to obtain about 10 parts per thousand microglass fiber in PET, or about 1 weight percent. This esterfication process was performed under pressure of about 35 psig to form an esterification product. Subsequently, 210 ppm antimony catalyst was added to the esterification product, which product was then melt processed by polycondensation for about 2 and ½ hours under vacuum of about 0.2 mmHg and a vessel termperature of 275° C., the batch termperature being maintained at 270° C. The melt temperature obtained was about 256° C. at an intrinsic viscosity of about 0.58. Two such 25 pound batches were made and combined, followed by solid stating in a blender dryer at 460° F. to reach an IV of 0.985.

EG/Slurry Esterification Method

Likewise, two 25 pound batches were prepared by using a 5 weight percent microglass fiber-ethylene glycol slurry mixture, added to same amount of TPA as noted in the paragraph above, but using only 4 pounds of ethylene glycol and 1815 g of the microglass fiber slurry in ethylene glycol to obtain 10 parts per thousand microglass fiber and PET polymer, corresponding to about a 1 weight percent microglass fiber addition. All of the other conditions as noted in the paragraph above were the same. The two batches thus made were combined and solid state polymerized also in a blender dryer at 460° F. to obtain intrinsic viscosity of 0.988.

The control was prepared in accordance with the procedures set forth in Example 1 above, in a 60 g batch.

The next two samples were prepared in glass tube reactors using the dry bulk esterification method to prepare 60 gram batches of esterification products having an IV of 0.098 and a carboxyl content of 671 eq/$10^6$ g, and a melt point of 231° C. The first sample, another comparative example, was prepared using 1 weight percent of Owens Corning Glass chopped fibers having an aspect ratio of about 500 and a diameter of about 13 microns was prepared according to the following procedure. A 60 gram batch was prepared by adding to the glass tube reactor 60 g of the esterification product, 210 ppm of antimony trioxide, and sufficient Owens Coming Glass chopped fibers to yield 1 wt.% based on the weight of the PET finished product. Once the esterification product was melted at 250° C. in the reactor, the temperature was raised to 275° C. and <1 mmHg was applied for 2 hours and 55 minutes. The product was then solid state polymerized in a small size reator using 60 g batches. The batches were crystallized at 200° C. for 30 minutes, and then the temperature was raised and maintained at 232° C. for solid state reaction using a nitrogen flow of 6 SCFH. Samples for IV were taken every ½ to 1 hour to obtain a final IV of 1.0.

This same procedure was used to make a PET batch containing 1 wt.% of a microfiber glass, except that the microglass fibers had dimensions which were about 0.5 micron diameter and a 2000 mean aspect ratio.

The thermal characteristics of the control, the PET prepared with one weight percent of standard glass fibers, and the PET samples prepared with the microglass fibers added in bulk and by the slurry method at one weight percent, are tabulated below.

TABLE 3

| Sample | $T_g$ °C. | Mp °C. | Crystallization Peak, °C. | | | Crystallization half time (s) | Crystallization % |
|---|---|---|---|---|---|---|---|
| | | | Onset | Peak | End | | |
| Control* | | | | | | | |
| Heating | 74.5 | 254.1 | 127.1 | 141.6 | 150.9 | 76.8 | 24.6 |
| Cooling | | | 215.9 | 204.3 | 183.2 | 84.8 | 33.9 |
| 1.0% Chopped Glass/PET** | | | | | | | |
| Heating | 75.1 | 254.3 | 111.3 | 121.1 | 128 | 63.8 | 20.2 |
| Cooling | | | 212.2 | 200.2 | 177.9 | 71.8 | 34.2 |
| 1.0% microglass fiber/PET bulk** | | | | | | | |
| Heating | 75.8 | 255.2 | 115.1 | 121.6 | 133.3 | 37.2 | 19.7 |
| Cooling | | | 219.9 | 216.2 | 198.4 | 30.3 | 33.7 |
| 1.0% microglass fiber/PET bulk* | | | | | | | |
| Heating | 77.2 | 256.4 | 118.6 | 127.8 | 135.2 | 42.8 | 20.3 |
| Cooling | | | 221.7 | 215.4 | 207.6 | 34.8 | 33 |
| 1.0% microglass fiber/PET slurry* | | | | | | | |
| Heating | 76.2 | 255.2 | 116.9 | 125.1 | 131.8 | 42.3 | 20.1 |
| Cooling | | | 222.5 | 218.5 | 209.5 | 36.7 | 29.5 |

*25 pound batches
**60 g batches

The results indicated that the crystallization half times of the PET containing the microglass fibers, whether added in bulk or as a slurry, were much shorter than the crystallization half times of the control prepared by identical methods containing no microglass fiber and of the PET polymer containing the standard glass fibers. This would indicate that the unique size of the microglass fibers used in the invention is an important factor to obtaining the dramatically lowered crystallization half times, i.e., greater than 50 percent shorter in the cooling cycle.

EXAMPLE 3

The following example tests the thermal characteristics of PET samples containing microglass fibers processed through an extruder, out a die, and then foamed into a sheet.

A Leistritz extruder ZSE-27 with corotating screws, 32 L/D is used to prepare the foamed sheet. Carbon dioxide was used as a foaming agent at a rate of 225 grams per hour. The microglass fiber, which was the same as used in Example 1, was fed in dry bulk form into the main feed port of the extruder using an auxiliary K-2V feeder. The main feeder delivered the polyethylene terephthalate polymer at a rate of 30 pounds per hour. The extruder temperature zones were set to a 250° C. to 300° C. range. The extrudate temperature was recorded at 262° C., and a flat die was used. The PET used was VFR 9552 PETLITE® polymer commercially available from Shell Chemical Company. Without the addition of microglass fiber, this polymer became the control.

Thermal characteristics of each sample were tested by DSC according the same procedures noted above. The results are tabulated below in Table 4.

TABLE 4

| Sample | Mp, °C. | Crystallization Peak, °C. | | Crystallization Half Time, (s) |
| --- | --- | --- | --- | --- |
| | | Onset | Peak | |
| PETLITE ® VFR 9552 PET Control | | | | |
| Heating | 251 | 117.8 | 123.8 | 48.8 |
| Cooling | | 210.6 | 200.2 | 68.7 |
| Control + 1% microglass fiber | | | | |
| Heating | 253 | 115.4 | 122.5 | 43.5 |
| Cooling | | 219.2 | 211.8 | 54.2 |

On an industrial scale, the results confirm what was found in the laboratory, that is, that the rate of crystallization is improved as noted in the cooling cycle when microglass fibers as described herein are added to PET, the polyester polymer. The crystallization half time of PET polymer containing 1 weight percent microglass fiber was at least 20 percent shorter in the cooling cycle than the control. Further, the onset of crystallization in the cooling cycle occurred at a temperature which was about 8.6° C. higher than the onset of crystallization observed by the control, in the cooling cycle. Likewise, during the cooling cycle, the crystallization peak temperature of the microglass fiber containing PET arrived at its cyrstallization peak temperature about at least 10° C. earlier than the control. Consequently, these results confirm that the microglass fibers in the foam sheets are excellent nucleating agents. They also gave faster rates of crystallization and a more uniform cell structure than the control samples.

What I claim is:

1. A filled polyester polymer comprising a polyester polymer and microglass fibers having an aspect ratio of greater than 1000 and a mean diameter of 2 microns or less.

2. The polymer of claim 1, wherein the microglass fibers have a mean diameter of one micron or less.

3. The polymer of claim 2 wherein said polyester polymer comprises a polyalkylene terephthalate.

4. The polymer of claim 3, wherein the aspect ratio of the glass fiber ranges from 2000 to 5000.

5. The polymer of claim 4, wherein the amount of glass fiber is less than 2 weight percent based on the weight of the polymer.

6. The polymer of claim 5, wherein the amount of glass fiber is less than 1.5 weight percent based on the weight of the polymer.

7. The polymer of claim 6, wherein the polymer comprises polyethylene terephthalate.

8. The polymer of claim 1, wherein said polymer is foamed.

9. The polymer of claim 1, having a crystallization half time in seconds, which is at least 10 percent lower than a crystallization half time in seconds of the same polymer made in the absence of glass fibers, as measured by DSC in the cooling cycle from 290° C. at a rate of 10° C. per minute.

10. The polymer of claim 9, wherein the crystallization half time is at least 20 percent less.

11. The polymer of claim 10, wherein the crystallization halftime is at least 30 percent less.

12. The polymer of claim 1, comprising an onset of a crystallization peak as measured by DSC in the cooling cycle from 290° C. at a rate of 10° C. per minute, wherein the onset of said crystallization peak arrives at a temperature which is at least 5° C. ahead of the same polymer containing no glass fiber.

13. The polymer of claim 12, wherein the onset of the crystallization peak arrives at least 7° C. ahead.

14. The polymer of claim 1, comprising a crystallization peak as measured by DSC in the cooling cycle from 290° C. at a rate of 10° C. per minute, wherein the peak crystallization temperature of the polymer arrives at a temperature which is at least 5° C. higher than the same polymer containing no glass fiber.

15. The polymer of claim 14, wherein the peak crystallization temperature of the polymer arrives at a temperature which is at least 8° C. higher than the same polymer containing no glass fiber.

16. The polymer of claim 1, wherein said polymer comprises a polyethylene terephthalate molded tray.

17. The polymer of claim 1, wherein the microglass fibers have a mean diameter ranging from 0.2 to 0.8 microns.

18. A process for manufacturing a filled polyester polymer comprising combining microglass fibers having an aspect ratio of greater than 1000 and a mean diameter of 2 microns or less with a polyester polymer during or subsequent to the manufacture of the polyester polymer.

19. The process of claim 18, wherein said microglass fibers are added to a reaction zone containing monomers suitable for manufacturing a polyester polymer.

20. The process of claim 18, comprising extrusion molding said filled polyester polymer from a melt to a mold.

21. The process of claim 18 comprising extrusion molding said filled polyester polymer to a sheet.

22. The process of claim 18, comprising injection molding said filled polyester polymer.

23. The process of claim 18, comprising extrusion molding said filled polyester polymer to form a foamed molded object or a foamed sheet.

24. The process of claim 23, wherein said glass fibers have a diameter of one micron or less.

25. The process of claim 24, wherein said polyester polymer comprises a polyethylene terephthalate.

26. The process of claim 25, wherein the aspect ratio of the glass fiber ranges from 2000 to 5000.

27. The process of claim 18, wherein the microglass fibers have a mean diameter ranging from 0.2 to 0.8 microns.

* * * * *